United States Patent [19]
Feichtinger et al.

[11] Patent Number: 5,758,427
[45] Date of Patent: Jun. 2, 1998

[54] ANGULAR-POSITION MEASURING DEVICE HAVING A MOUNTING ELEMENT FOR TORSION-PROOF MOUNTING OF A STATOR TO A STATIONARY OBJECT

[75] Inventors: Kurt Feichtinger, Palling; Johann Mitterreiter, Chieming, both of Germany

[73] Assignee: Dr. Johannes Heidenhain GmbH, Traunreut, Germany

[21] Appl. No.: 707,652

[22] Filed: Sep. 5, 1996

[30] Foreign Application Priority Data

Sep. 6, 1995 [DE] Germany .......... 195 32 824.8
Dec. 1, 1995 [EP] European Pat. Off. .......... 95118933

[51] Int. Cl.⁶ .......... G01D 5/26; G01D 5/34
[52] U.S. Cl. .......... 33/1 PT; 33/572; 250/231.13
[58] Field of Search .......... 33/1 PT, 1 N, 33/706, 707, 708, 572; 250/231.13, 231.14, 231.18

[56] References Cited

U.S. PATENT DOCUMENTS

| | | |
|---|---|---|
| 4,031,441 | 6/1977 | Garrett .......... 250/231.13 |
| 4,386,270 | 5/1983 | Ezekiel . |
| 4,464,506 | 8/1984 | Alberts et al. . |
| 4,472,713 | 9/1984 | Breslow . |
| 4,495,700 | 1/1985 | Ernst . |
| 4,512,184 | 4/1985 | Ernst et al. .......... 250/231.13 |
| 4,870,272 | 9/1989 | Wilson, III .......... 250/231.13 |
| 4,942,295 | 7/1990 | Brunner et al. .......... 250/231.13 |
| 5,057,684 | 10/1991 | Service .......... 250/231.13 |
| 5,407,294 | 4/1995 | Giannini .......... 250/231.13 |

FOREIGN PATENT DOCUMENTS

| | | |
|---|---|---|
| 0 280 390 | 8/1988 | European Pat. Off. . |
| 29 06432 | 11/1979 | Germany . |
| 85044075 U | 4/1985 | Germany . |
| 88123170 U | 11/1988 | Germany . |
| 89151097 U | 12/1989 | Germany . |
| 62-155313 | 6/1986 | Japan . |

Primary Examiner—Thomas B. Will
Attorney, Agent, or Firm—Brinks Hofer Gilson & Lione

[57] ABSTRACT

A stator of an angular-position measuring device is connected by means-of a coupling with the stationary portion of a drive device. A mounting element is screwed to the coupling, in which a coupling element is provided for radial clamping between the coupling and the stator.

58 Claims, 8 Drawing Sheets

ANGULAR-POSITION MEASURING DEVICE HAVING A MOUNTING ELEMENT FOR TORSION-PROOF MOUNTING OF A STATOR TO A STATIONARY OBJECT

FIELD OF THE INVENTION

The present invention relates to an angular-position measuring device for measuring the angular position between a stationary object and an object which is rotatable on an axis of rotation with respect to the stationary object, by scanning a scale using a scanning unit, wherein the scanning unit is fastened on a stator of the angular-position measuring device, and wherein a mounting element is provided between the stator and the stationary object for fastening the stator in a torsion-proof manner on the stationary object.

BACKGROUND OF THE INVENTION

It is known to rigidly mount angular-position measuring devices on a mounting surface of a drive device. Fastening is provided with screws, which pass through a flange of the angular-position measuring device and are screwed into the mounting surface. A disadvantage of this method is that it is labor-intensive and the drill holes in the flange must be exactly matched with the threads in the mounting surface.

To avoid these disadvantages, it has been proposed in German Utility Model DE 85 04 407 U1 to fasten the angular-position measuring device to the drive device using a clamping ring. This clamping ring encloses the two flanges of the angular-position measuring device and of the drive device. A disadvantage of this method is that the flanges must have the same exterior diameter and a large space must be radially available for actuating the clamping ring, because of which its use is very limited.

Often couplings are employed between a stator, for example, of a housing or a mounting flange, and a scanning device of an angular-position measuring device. Couplings are also employed for the torsion-proof connection of a housing or mounting flange of the angular-position measuring device with the housing of a drive device wherein the angular position of the rotating shaft is to be measured.

A coupling device, between the rotating shafts of an angular-position measuring device and an object to be measured, as well as between the stators of the angular-position measuring device and the object to be measured is known from German Patent Publication DE 29 06 432 C2. The shafts are rigidly connected with each other without any possibility of adjustment, and the stators are connected with each other resiliently, but not rotatably, by a parallel guide. Wobble movements of the shaft are optimally compensated by two parallel guides arranged vertically with respect to each other, without the respective shafts and stators being able to perform twisting with respect to each other. The coupling, at least in the form of a parallel guide, does not perform any rotary movements in the process. The fastening of the coupling on the object to be measured is not explained.

A similar angular-position measuring device with a coupling between an engine housing and a housing (stator) of an angular-position measuring device is described in U.S. Pat. No. 4,386,270. The coupling is a bellows coupling which is axially screwed to the engine housing by means of a mounting flange.

In order to prevent wobble movements of the housing, i.e., stator of the angular-position measuring device, according to German Patent Publication DE 32 06 875 C2 and U.S. Pat. Nos. 4,495,700 and 4,464,506 the coupling is disposed inside the angular-position measuring device. U.S. Pat. Nos. 4,495,700 and 4,464,506 disclose a coupling having an intermediate ring disposed inside the housing of the angular-position measuring device, one side of which is connected by a pair of diametrically disposed springs with the stationary scanning device, and the other side of which is connected with the housing of the angular-position measuring device by a pair of diametrically disposed springs offset by 90° with respect to the first. German Patent Publication DE 33 01 205 C2 discloses a coupling of a spring bellows arranged coaxially with the pick-up shaft and connecting the scanning device with the housing of the angular-position measuring device.

German Utility Model DE 89 15 109 U1 discloses an angular-position measuring device with a coupling in the form of one piece having four leaf-spring arms respectively offset by 90° with respect to each other, and oriented parallel with the axis of rotation of the shafts. These leaf spring arms constitute two spring parallelograms disposed vertically with respect to each other. The spring arms of the coupling are axially screwed to a drive unit.

German Utility Model DE 88 12 317 U1 and Japanese Utility Model JP 62 155313 U disclose angular-position measuring devices wherein the scanning device is fastened via a coupling to an object. Radially outwardly oriented sheet metal spring plates have a common outer mounting ring. In German Utility Model DE 88 12 317 U1 it is proposed to fasten the mounting ring on an object by bores, and in Japanese Utility Model JP 62 155313 U axial bores in the mounting ring and axial threaded bores in the object are provided for fastening.

SUMMARY OF THE INVENTION

It is an object of the present invention to provide an angular-position measuring device which is extremely compact and simple to mount and also assures exact coupling.

Advantages achieved by the present invention are that the angular-position measuring device can be mounted simply and in a space-saving manner. The radial, and particularly, the axial manufacturing tolerance of the elements needed for mounting can be relatively large. Since the axial mounting position is not already provided during manufacture, angular-position measuring devices can be mounted on a drive device by means of a coupling on the stator in the axial direction without pre-stress. The accuracy of the angular-position measuring device is increased by this.

The invention itself, together with further objects and attendant advantages, will best be understood by reference to the following detailed description, taken in conjunction with the accompanying drawings.

DETAILED DESCRIPTION OF THE PRESENTLY PREFERRED EMBODIMENTS

Figure 1:
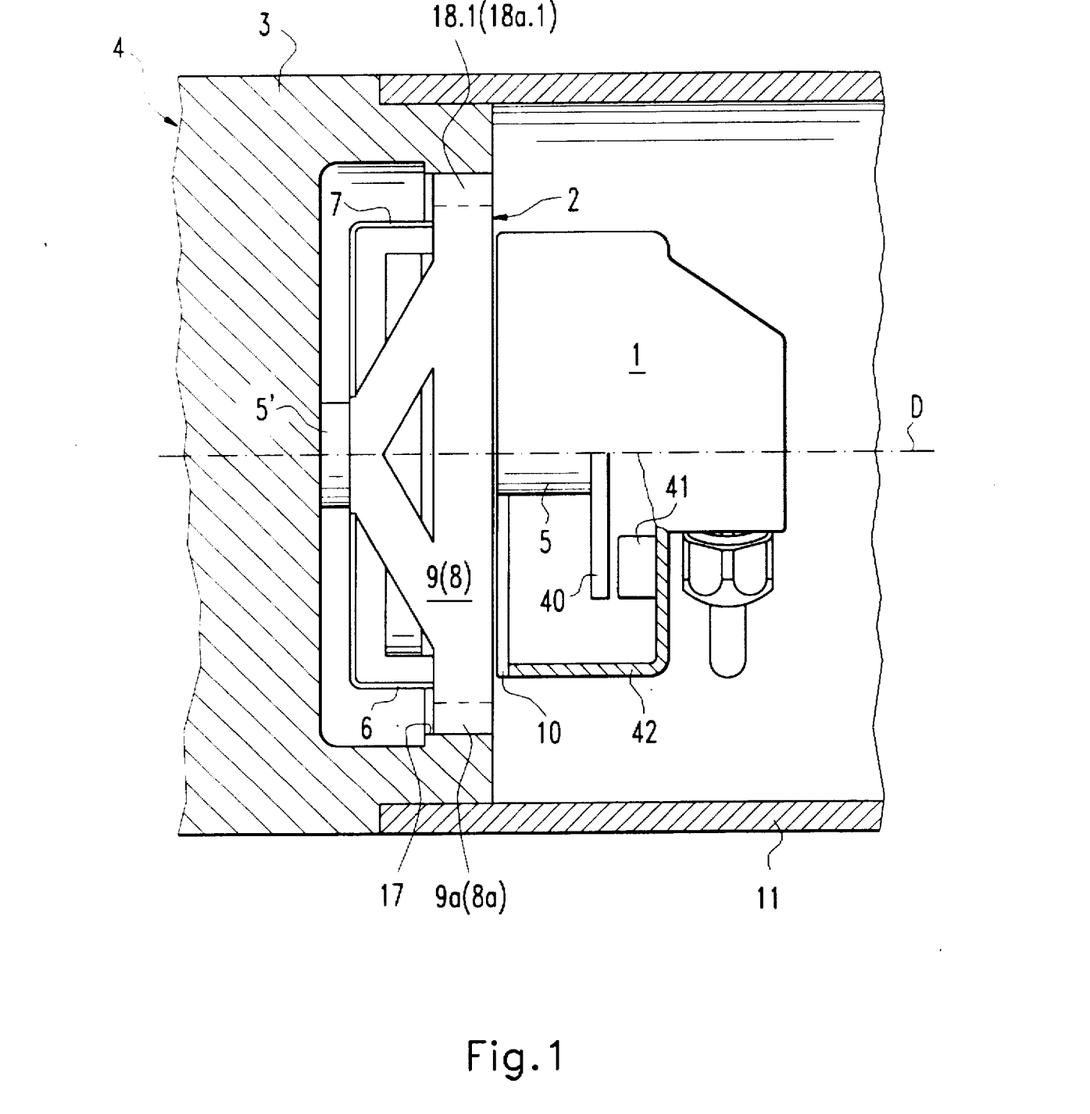
FIG. 1 is a cross-sectional view of an angular-position measuring device with a coupling according to a preferred embodiment of the present invention.

FIG. 1 is a cross-sectional view of an angular-position measuring device with a coupling according to a preferred embodiment of the present invention. The angular-position measuring device 1 is connected with a stator 3 of a drive device 4 by a coupling 2. The shaft 5 of the angular-position measuring device 1 is rigidly coupled with the shaft 5' of the drive device 4. The coupling 2 has leaf spring arms 6 and 7 which will be discussed in greater detail hereinafter. The free ends of axis-parallel leaf spring arms 6 and 7 are connected with the stator 10 of the angular-position measuring device 1 by screws which can be seen with reference to FIG. 4. A housing 11 encloses the drive device 4 as well as the angular-position measuring device 1. The stator 3 of the drive device 4 may be the stationary portion of an engine, for example. The stator 10 of the angular-position measuring device 1 is a stationary portion of the angular-position measuring device, for example, a mounting flange, the scanning device or the housing of the angular-position measuring device. The angular position of the shaft 5 with relation to the stationary object 3 is measured by scanning a scale 40 connected with the shaft 5 by a scanning unit 41 in a known manner. In the embodiment illustrated, the scanning unit 41 is rigidly mounted on the housing 42 of the angular-position measuring device 1 and on the mounting flange 10. The mounting flange 10, the housing 42 and the scanning unit 41 form the stator of the angular-position measuring device 1. The coupling 2 fastens these elements 10, 42, 41 on the stationary object 3 of the drive device 4 in a torsion-proof, yet radially and axially resilient manner.

Figure 2:
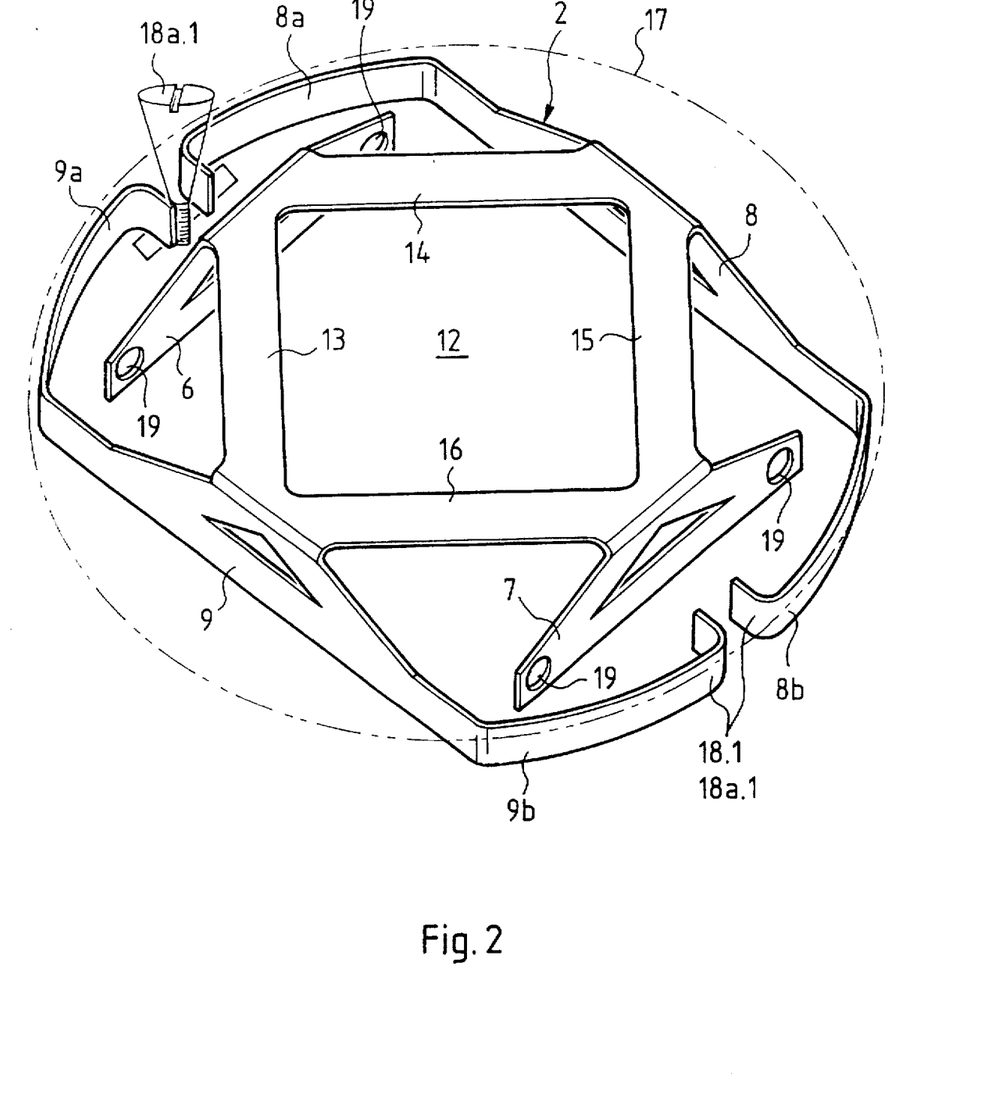
FIG. 2 is a perspective view of a coupling according to a preferred embodiment of the present invention.
Figure 3:
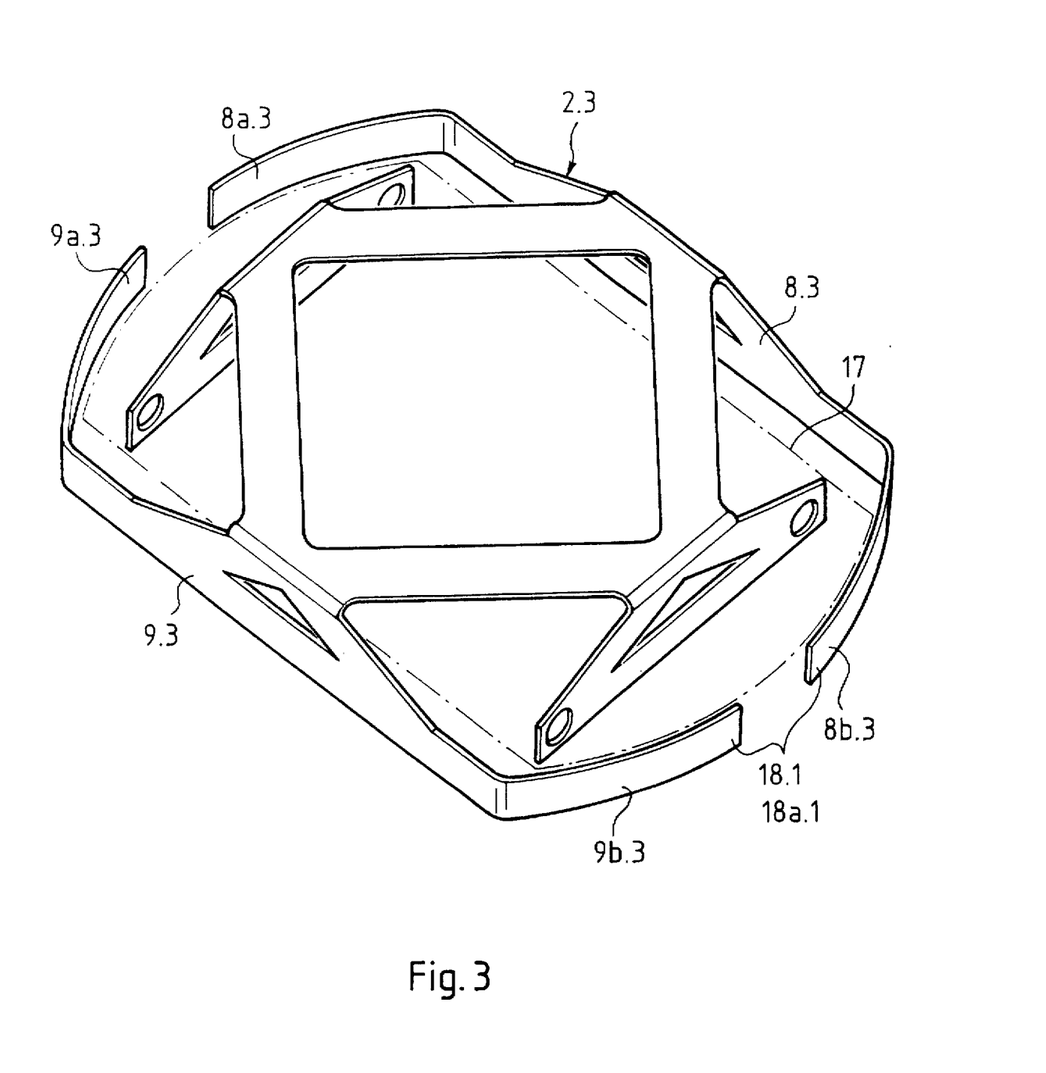
FIG. 3 is a perspective view of the coupling according to a preferred embodiment of the present invention.

The coupling 2 and 2₃ shown in FIGS. 2 and 3 respectively are preferably formed as a one piece, stamped and bent part made of a material of great fatigue strength, for example, spring steel. The coupling 2 has a flat center area with four leaf spring arms 6, 7, 8, 9, essentially extending parallel with the axis of rotation D, two of which 6 and 7 or 8 and 9, respectively, are disposed diametrically opposite each other. The leaf spring arms 6, 7, 8, 9 are oriented at least to a large extent parallel with the common axis of rotation D of the parts 1 and 4, which are to be connected. They are disposed in pairs diametrically opposite each other and parallel with each other, and in this way they form two spring parallelograms disposed vertically with respect to each other, which assures a torsion-proof, yet radially resilient connection of the two parts 1 and 4.

In the center area, the coupling 2 has a central opening 12, which is surrounded by further leaf spring arms 13, 14, 15, 16 which form a framework. These leaf spring arms 13, 14, 15, 16 assure a torsion-proof, yet axially resilient connection of the two parts 1 and 4 in the direction toward the axis of rotation D.

Each of the two leaf spring arms 6, 7, 8, 9 which lie diametrically opposite each other and are vertically bent with respect to the flat center section 12 is also advantageously embodied as a framework, but in the form of triangles, so that torque acting on the angular-position measuring device 1 from the direction of the shafts 5, 5' can be well absorbed and does not result in a twisting of both stators 3 and 10.

In two of these oppositely located leaf spring arms 6, 7 there are respectively two elongated holes 19, whose longitudinal axes extend parallel with the axis of rotation D. The elongated holes 19 permit adjustments between the elements 3, 10 to be coupled in the course of their fastening by means of screws on the angular-position measuring device 1.

The two other oppositely located leaf spring arms 8 and 9 have approximately circular bent leaf spring arms 8a, 8b, 9a, 9b as an extension of their bases. These leaf spring arms 8a, 8b, 9a, 9b are radially prestressed so that they must be compressed when being inserted into a tube 17 provided on the drive device 4. The tube 17 is indicated by means of a double dot/dashed line. The leaf spring arms 8a, 8b, 9a, 9b spread out after insertion into the tube 17, and the angular-position measuring device 1 is fixed, secure against relative rotation, in the drive unit 4 because of the radially outwardly directed component of the spreading forces. The radial and axial compensation movements and errors in the angular alignment are compensated without problems.

If the free ends of the leaf spring arms 8a, 8b, 9a, 9b are bent radially inward, as shown in FIG. 2, the leaf spring arms 8a, 8b, 9a, 9b can be radially spread with the aid of clamping elements 18a.1 in order to increase the spreading pressure against the inner surface of the cylindrical tube 17. Such a clamping element is schematically represented in FIG. 2 as an axially insertable conical screw 18a.1.

Interlocking inside the tube can be achieved in a manner not shown if the free ends of the leaf spring arms are radially bent outward. In that case they engage grooves which are, for example, diametrically disposed in the tube and are correspondingly dimensioned for preventing a rotary movement between the tube and the coupling.

The leaf spring arms can alternately be embodied and arranged in accordance with the teachings of German Utility Models DE 89 15 109 U1 or DE 88 12 317 U1. It is important that the coupling 2 is torsion-proof and exclusively permits axial and radial movements between the two elements 3 and 10 to be connected. The coupling, in the shape of two spring parallelograms arranged vertically with respect to each other, is particularly advantageous.

FIG. 3 is a perspective view of a coupling according to a preferred embodiment of the present invention. The coupling 3 is similar to the embodiment shown in FIG. 2, so that the explanation of elements which act in the same way is omitted in order to prevent repetition. The difference between the embodiment shown in FIG. 3 and the embodiment shown in FIG. 2 lies in the design of the extended base of the spring parallelogram 8.3, 9.3. In the embodiment shown in FIG. 3, the leaf spring arms 8a.3, 8b.3, 9a.3, 9b.3 are prestressed toward the interior and surround a correspondingly designed mounting shoulder 17 shown in dashed-dot line on the housing of the object to be measured (not shown) from the outside.

It is also possible in a manner not shown to provide an interlocking connection with respectively corresponding grooves in the mounting shoulder by bending the free ends of the leaf spring arms, and a clamping element can directly act on the leaf spring arms for radial clamping.

In connection with the embodiment shown in FIGS. 1 through 3, the mounting element 18.1 and the clamping element 18a.1 are constituted by the leaf spring arms 8a, 8b, 9a, 9b themselves.

Figure 4:
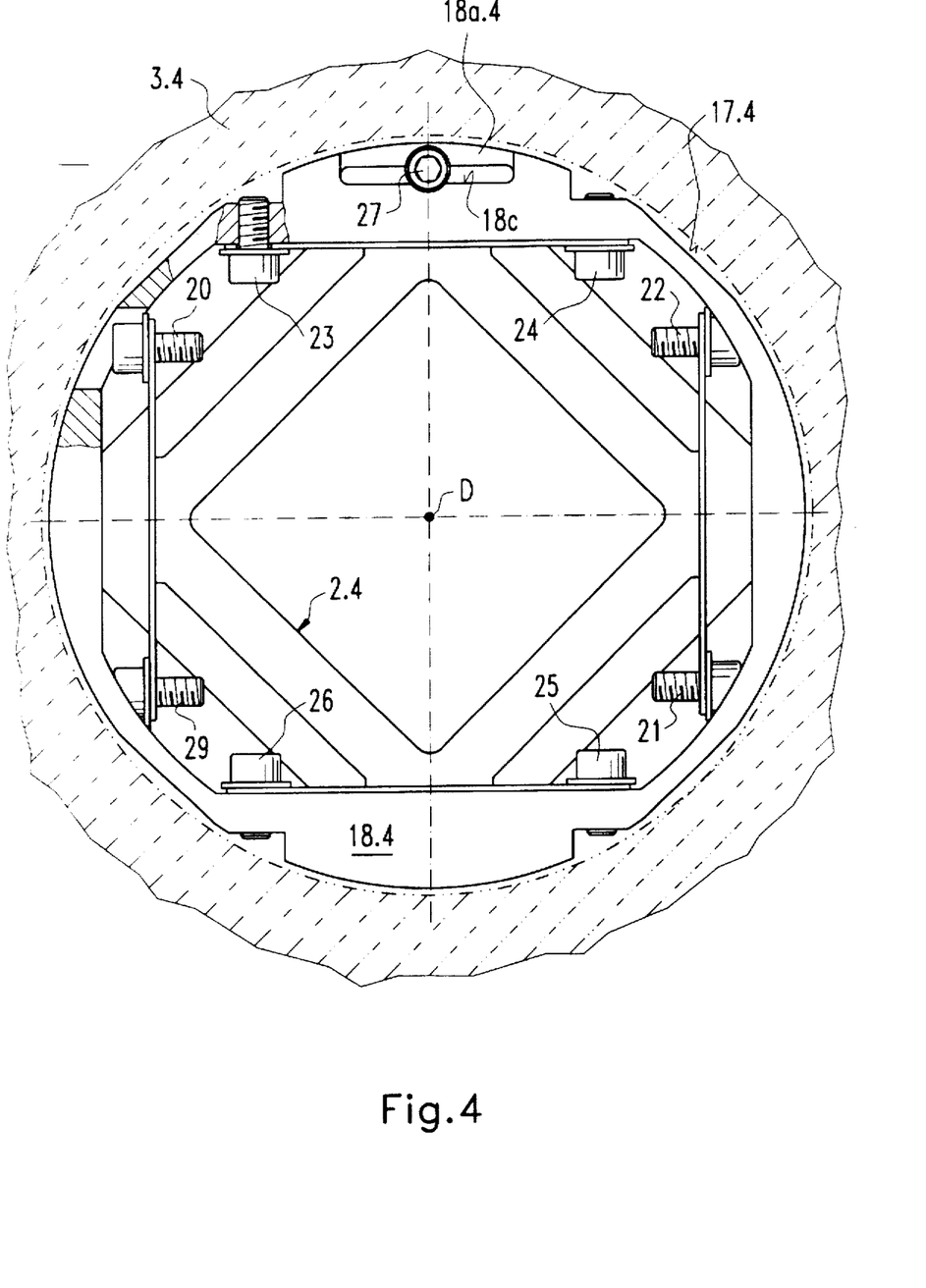
FIG. 4 is a top view of a coupling with mounting elements according to a preferred embodiment of the present invention.

FIG. 4 is a top view of a coupling 2.4 with mounting element 18.4 according to a preferred embodiment of the present invention. Screws 29, 20, 21, 22 are used for fastening the coupling 2.4 on the angular-position measuring device, not shown, as had already been indicated in connection with FIG. 1. The mounting element 18.4 is embodied as an annular element, which is essentially shaped as a circular ring. The coupling 2.4 is connected with this ring-shaped mounting element 18.4 by means of further screws 23, 24, 25, 26.

To receive the angular-position measuring device with the mounting element 18.4, the stator 3.4 of the drive unit 4 has a tube 17.4, which has a defined interior diameter matched to the exterior diameter of the mounting element 18.4.

The pre-mounted unit of the angular-position measuring device/mounting element is inserted into the tube 17.4, and the mounting element 18.4 is fixed in place in the tube 17.4 by means of a spreading body 18a.4, embodied as a clamping element. In the preferred embodiment, the spreading body 18a.4 is designed as a segment of a circle formed by a releasable section of the mounting element 18.4.

Figure 5:
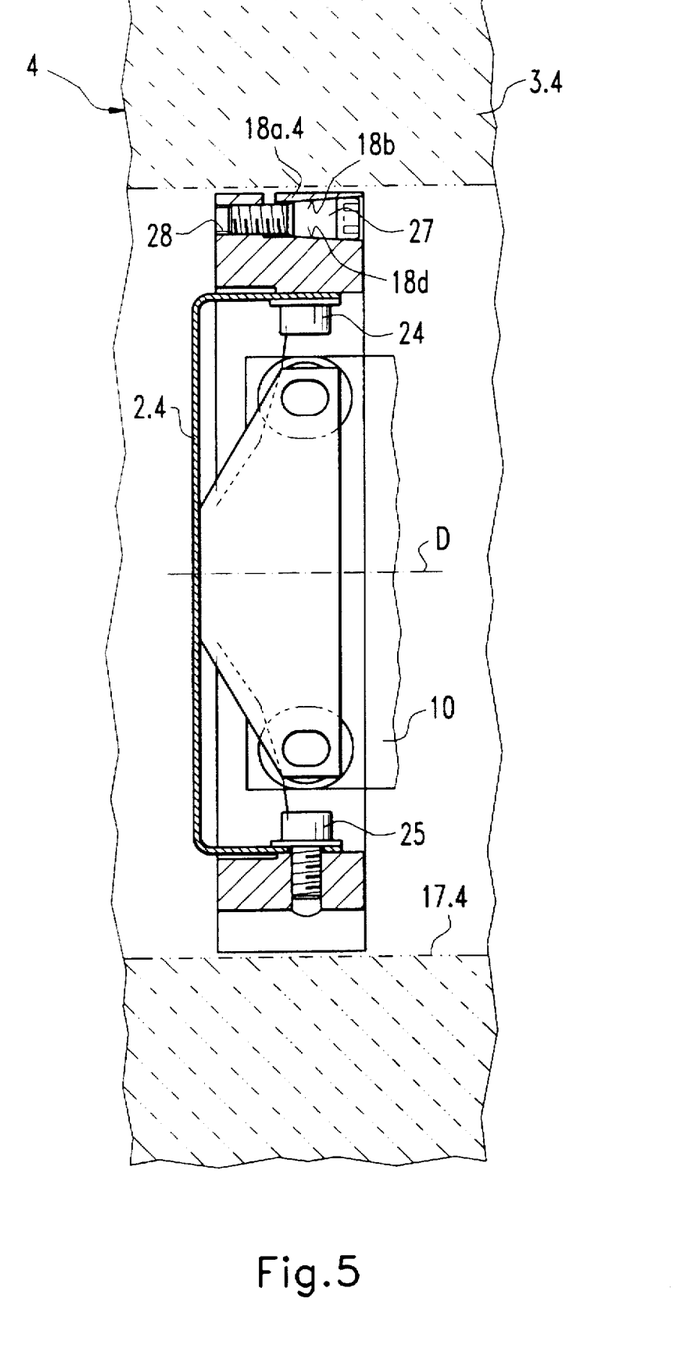
FIG. 5 is a cross-sectional view taken along line 5—5 of the coupling and mounting element shown in FIG. 4.

FIG. 5 is a cross-sectional view taken along line 5—5 of the coupling and mounting element shown in FIG. 4. On its flat section surface facing away from the exterior circumference of the mounting element 18.4, the segment of a circle 18a.4 has a conical partial bore 18b. On an also flat surface 18c located opposite the flat section surface of the segment of a circle 18a.4, the mounting element 18.4 also has a conical partial bore 18d, which corresponds with the partial bore 18b of the segment of a circle 18a.4. A conical screw 27, whose cone corresponds to that of the two corresponding partial bores 18b and 18d, cooperates as the actuating element with a counter-thread 28 located in the mounting element 18.4. When turning the conical screw 27 into the counter-thread 28 on the mounting element 18.4, the screw 27 slides into the two partial bores 18b and 18d and spreads them open, so that the segment of circle 18a.4 is pushed away from the mounting element 18.4 and is pressed against the interior surface of the tube 17.4.

With such a configuration, the angular-position measuring device, coupling and mounting elements are fixed in the drive unit 4 in the simplest way.

It is particularly advantageous if the spreading body is a part of the mounting element itself, in that this element is connected, for example, by a weak point with the mounting element and can be radially pressed against a radially extending interior or exterior surface by an actuating element, for example, a conically or eccentrically shaped screw. The mounting element is designed so solidly that it absorbs the counter-force of the actuating element, so that only the spreading body is deformed and no force acts on the coupling.

Figure 6:
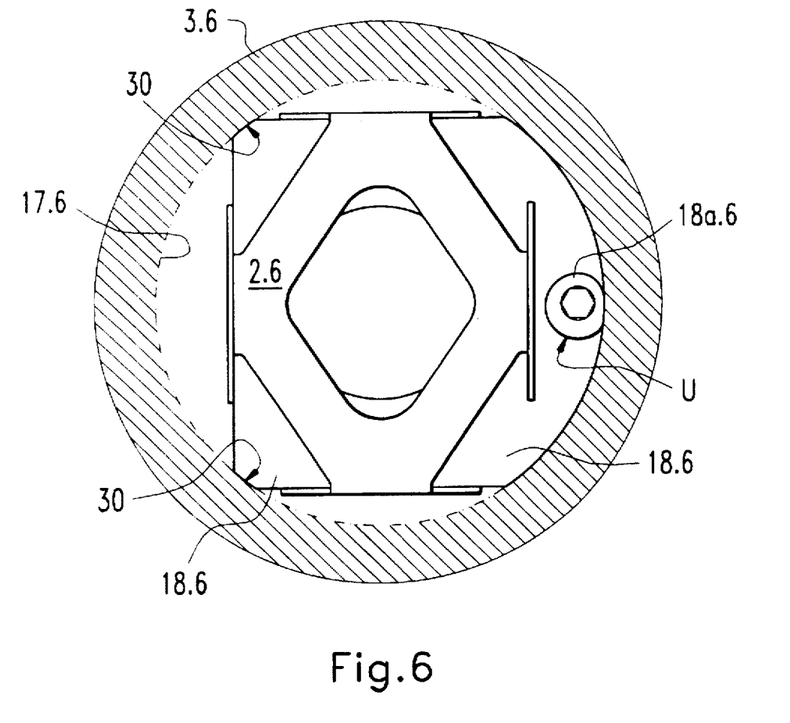
FIG. 6 is a top view of a coupling with a mounting element according to a preferred embodiment of the present invention.

FIG. 6 is a top view of a coupling with a mounting element according to a preferred embodiment of the present invention. In this example, the scanning unit of the angular-position measuring device, not shown, is coupled by the coupling 2.6 radially and axially resiliently with the stator 3.6 of a drive device. For simple fastening of the coupling 2.6 on the angular-position measuring device, the coupling 2.6 is also provided here with a ring-shaped mounting element 18.6. A clamping element in the form of an eccentric screw 18a.6 is provided in the mounting element 18.6 for radial clamping of this mounting element 18.6 against an interior surface of the tube 17.6.

Figure 7:
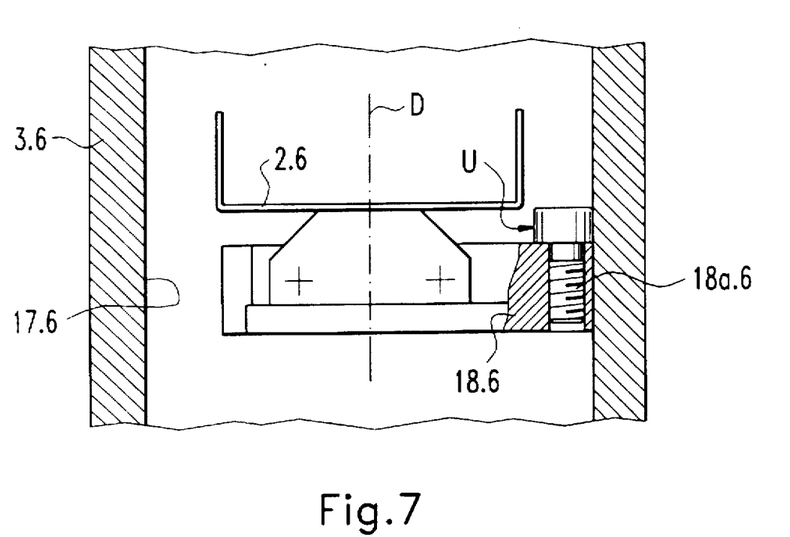
FIG. 7 is a cross-sectional view taken along line 7—7 of the coupling and mounting element shown in FIG. 6.

FIG. 7 is a cross-sectional view taken along line 7—7 of the coupling and mounting element shown in FIG. 6. The head of this eccentric screw 18a.6 has an eccentrically extended circumferential surface U, which comes into contact with the tube 17.6 by being rotated and causes a radial clamping force between the mounting element 18.6 and the stator 3.6. In the represented example, the mounting element 18.6 is pressed with contact surfaces 30 against an interior wall of the tube 17.6.

Figure 8:
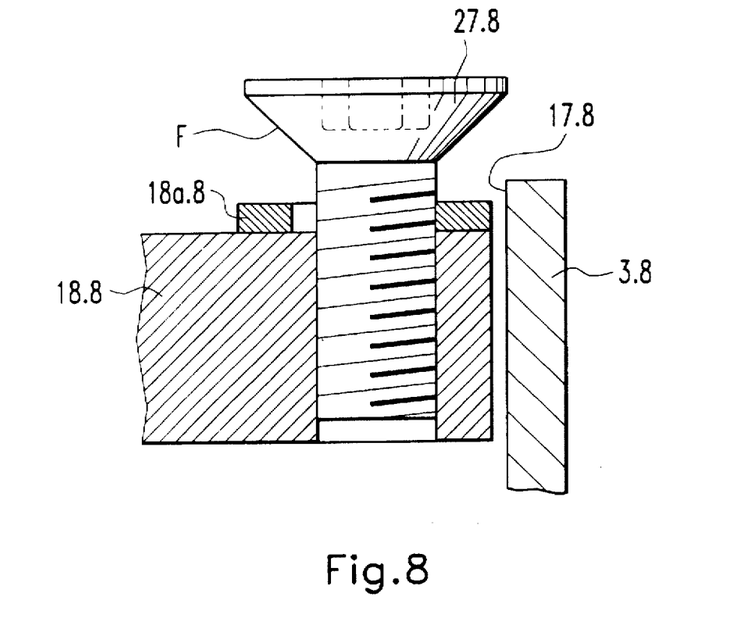
FIG. 8 is a cross-sectional view of a mounting element with a clamping element according to a preferred embodiment of the present invention.
Figure 9:
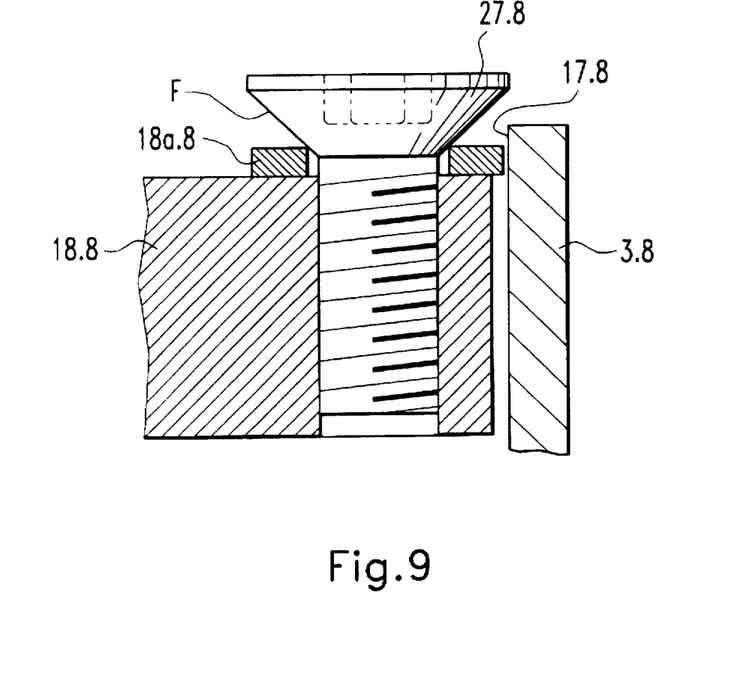
FIG. 9 shows the clamping element shown in FIG. 8 in a clamped state.

FIG. 8 is a cross-sectional view of a mounting element with a clamping element according to a preferred embodiment of the present invention. A countersunk screw 27.8 is employed as the actuating element, instead of an eccentric screw. During insertion into the mounting element 18.8, the conical surface F of the countersunk screw 27.8 acts on a washer 18a.8 and displaces the mounting element 18.8 radially outward, as can be seen in FIG. 9. Thus the washer 18a.8 is the clamping element, which causes a radial clamping of the mounting element 18.8 inside the tube 17.8 of the stator 3.8. As already mentioned, it is possible here, to directly deform a portion of the mounting element 18.8 itself by means of the countersunk screw 27.8 and to achieve clamping.

Figure 10:
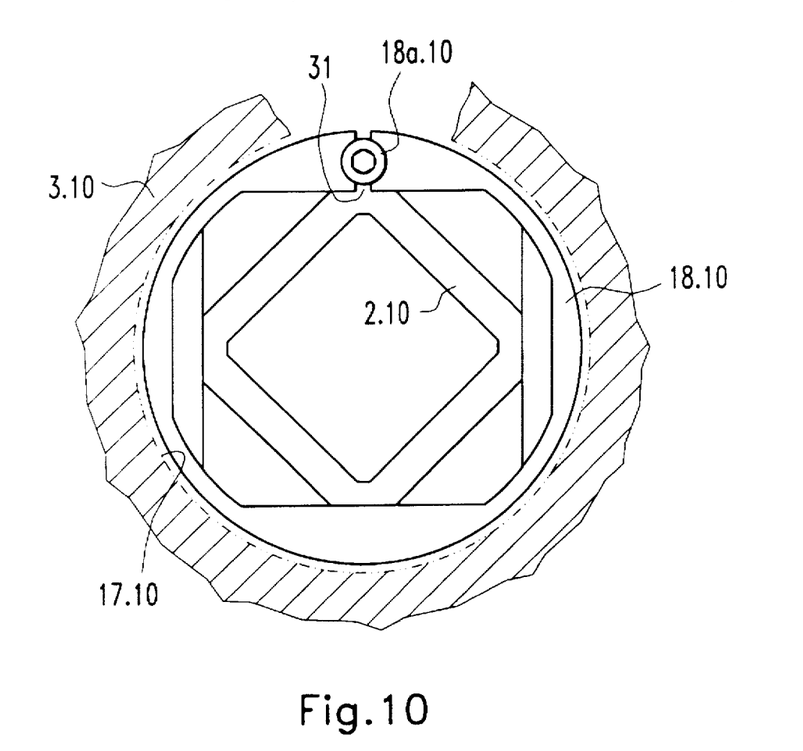
FIG. 10 is a top view of a coupling with a mounting element according to a preferred embodiment of the present invention.
Figure 11:
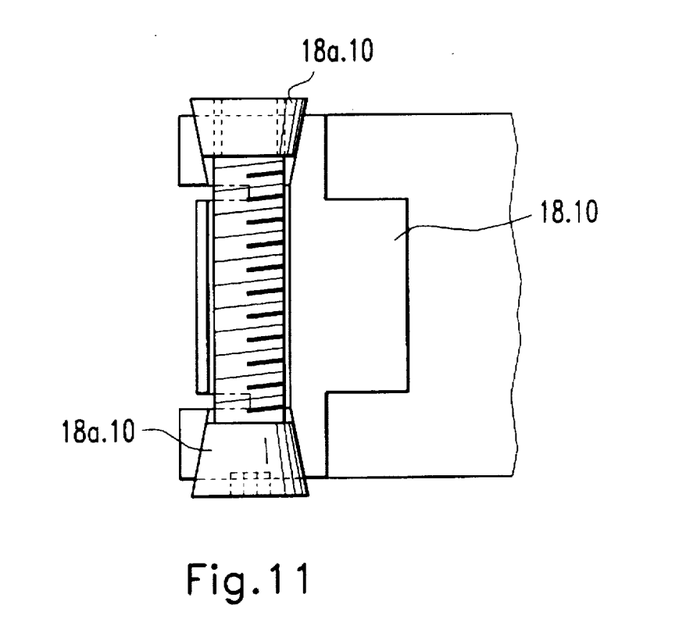
FIG. 11 is a partial cross-sectional view of the coupling and mounting element shown in FIG. 10.

FIG. 10 is a top view of a coupling with a mounting element according to a preferred embodiment of the present invention. FIG. 11 is a partial cross-sectional view of the coupling and mounting element shown in FIG. 10. The coupling 2.10 for radial and axial compensation is fastened on a ring-shaped mounting element 18.10. At least one radially extending slit 31 is provided in this mounting element 18.10. This slit 31 divides the mounting element 18.10 in such a way that the exterior diameter of the mounting element 18.10 can be increased by a clamping element 18a.10 acting in the slit 31. This spreading of the mounting element 18.10 takes place by means of two clamping elements 18a.10, disposed spaced apart in the axial direction behind each other. These clamping elements 18.10 have opposed conical tapering surfaces, which are supported on corresponding surfaces of the mounting element 18.10. In a preferred embodiment, one of these clamping elements 18a.10 is a screw and the other a nut. By turning the screw, the two clamping elements 18a.10 are pulled toward each other, so that the gap 31 is increased because of the wedge effect. The screw can also be called an actuating element. In a manner not shown, the screw can also only be supported in the axial direction on a flat surface, so that only the nut is used as a clamping element. In place of a tapered surface it is also possible to employ a wedge-shaped surface.

With the preferred embodiments thus described, the fastening of the coupling 2 on the angular-position measuring device 1 took place using screws. Alternatively, if for reasons of space there should be problems with this pre-mounting, there is the possibility to provide a mounting element, for example a ring, on which the coupling is fastened and which can be connected, secure against relative rotation, with the stator of the angular-position measuring device by means of the radial clamping in accordance with the present invention. In this case, a clamping element on the stator side can cause radial clamping between the coupling and the mounting element and/or between the mounting element and the stator. In an analogous manner, a clamping element on the object side can cause radial clamping between the coupling and the mounting element and/or between the mounting element and the stationary object depending on the available space conditions.

It is particularly advantageous to employ a ring-shaped mounting element 18, since even clamping over the circumference is made possible. With all described examples it is advantageous if the radial clamping causes a support on exclusively three areas distributed over the circumference, i.e. if, for example, the mounting element 18.4 touches the tube 17.4 in three areas which are spaced apart in the circumferential direction. One of these areas should be a linear contact (parallel with the axis D), and a point contact should be respectively realized in the other two areas. This assures that the two elements to be mounted on each other are clamped in an axis-parallel manner.

The mounting element and the clamping element can furthermore be parts of the coupling, as shown by way of example in FIG. 2. In this case the leaf spring arms 8a, 9a, 8b, 9b form the mounting element 18.1 as well as the clamping element 18a.1. But the mounting element and the clamping element can also be an integral part of the stationary object or of the stator of the angular-position measuring device.

There is a further possibility that the coupling is an integral part of the stator, in particular, is made of one piece with the sheet metal housing of the angular-position measuring device. But the coupling can also be formed as one piece on the stationary object.

Mounting in accordance with the present invention first opens the possibility to install the angular-position measuring device directly inside the flange of an engine, i.e. in the engine bearing shield, without requiring material on the engine which preferably is an electric motor for receiving threaded bores. The provision of a coupling between the stationary object and the stator is particularly advantageous, but not necessary. Thus, in accordance with the present invention, the stator (scanning unit) can be directly connected in a radially clamped way with the stationary object. This is particularly advantageous with built-in angle encoders, wherein the support of the scanning unit is to be installed without housing and scale in an engine.

With all preferred embodiments described with radial clamping, the clamping can act on an interior or an exterior circumferential surface. This circumferential surface is a surface which is oriented toward or away from the axis of rotation.

The axially accessible actuating element 27 or clamping element 18a is advantageously disposed between the outer contour of the angular-position measuring device i and the tube 17. By means of this it is assured that the actuating element 27 or the clamping element 18a are axially accessible by means of a tool even in the mounted state.

The term radial defines a direction which at least primarily extends vertically with respect to the axis of rotation D.

In accordance with the present invention the possibility of arranging all elements 18 required for mounting the coupling 2 on the stator 3 within the structural length of the coupling 2 itself is particularly advantageous.

The present invention can be employed with angular-position measuring devices in the form of incremental as well as absolute angle encoders, multiturns, rpm sensors, synchro resolvers as well as velocity measuring devices. The scanning principle of the measuring representation in this case can be optical, magnetic, capacitive or inductive.

It is to be understood that the forms of the present invention described herewith are to be taken as preferred examples and that various changes in the shape, size and arrangement of parts may be resorted to, without departing from the spirit of the present invention or scope of the claims.

What is claimed is:

1. An angular-position measuring device for measuring the angular position between a stationary object and an object which is rotatable with respect to the stationary object on an axis of rotation, the device comprising:
   a scanning unit for scanning a scale wherein the scanning unit is fastened on a stator of the angular-position measuring device;
   a mounting element provided between the stator and the stationary object for fastening the stator in a torsion-proof manner on the stationary object, wherein the mounting element has at least a clamping element for radial clamping between the stator of the angular-position measuring device and the stationary object, wherein an actuating element cooperates with the clamping element and is aligned in a direction parallel with the axis of rotation and is accessible and actuable in this direction for clamping.

2. The angular-position measuring device according to claim 1 further comprising a torsion-proof, yet radially and axially resilient coupling interposed between the stator of the angular-position measuring device and the stationary object, wherein the mounting element with at least one clamping element is provided for radial clamping between the stator and the coupling.

3. The angular-position measuring device according to claim 2, wherein the clamping element causes a radial coupling between the coupling and the mounting element.

4. The angular-position measuring device according to claim 2, wherein the clamping element causes a radial coupling between the mounting element and the stator.

5. The angular-position measuring device according to claim 1 further comprising a torsion-proof, yet radially and axially resilient coupling interposed between the stator of the angular-position measuring device and the stationary object, wherein the mounting element with at least one clamping element is provided for radial clamping between the stationary object and the coupling.

6. The angular-position measuring device according to claim 5, wherein the clamping element causes a radial coupling between the coupling and the mounting element.

7. The angular-position measuring device according to claim 5, wherein the clamping element causes a radial coupling between the mounting element and the stationary object.

8. The angular-position measuring device according to claim 1, wherein the mounting element is a ring-shaped body disposed between the stationary object and a coupling to which the clamping element is coupled.

9. The angular-position measuring device according to claim 1, wherein the mounting element is a ring-shaped body disposed between the stator and a coupling to which the clamping element is coupled.

10. The angular-position measuring device according to claim 2, wherein the mounting element is a ring-shaped body disposed between the stationary object and the coupling, to which the clamping element is coupled.

11. The angular-position measuring device according to claim 2, wherein the mounting element is a ring-shaped body disposed between the stator and the coupling to which the clamping element is coupled.

12. The angular-position measuring device according to claim 3, wherein the mounting element is a ring-shaped body disposed between the stationary object and the coupling to which the clamping element is coupled.

13. The angular-position measuring device according to claim 3, wherein the mounting element is a ring-shaped body disposed between the stator and the coupling to which the clamping element is coupled.

14. The angular-position measuring device according to claim 5, wherein the mounting element is a ring-shaped body disposed between the stationary object and the coupling to which the clamping element is coupled.

15. The angular-position measuring device according to claim 5, wherein the mounting element is a ring-shaped body disposed between the stator and the coupling to which the clamping element is coupled.

16. The angular-position measuring device according to claim 6, wherein the mounting element is a ring-shaped body disposed between the stationary object and the coupling to which the clamping element is coupled.

17. The angular-position measuring device according to claim 6, wherein the mounting element is a ring-shaped body disposed between the stator and the coupling to which the clamping element is coupled.

18. The angular-position measuring device according to one of claims 2 to 6, wherein the mounting element is rigidly fastened on the coupling.

19. The angular-position measuring device according to claim 2 wherein the mounting element is formed as one piece with the coupling.

20. The angular-position measuring device according to claim 3 wherein the mounting element is formed as one piece with the coupling.

21. The angular-position measuring device according to claim 5 wherein the mounting element is formed as one piece with the coupling.

22. The angular-position measuring device according to claim 6 wherein the mounting element is formed as one piece with the coupling.

23. The angular-position measuring device according to claim 6, wherein the clamping element is displaceable in order to cause radial clamping between the mounting element and the stationary object.

24. The angular-position measuring device according to claim 1, wherein the clamping element is rotatable in order to cause radial clamping between the mounting element and the stationary object.

25. The angular-position measuring device according to claim 1, wherein the clamping element is deformable in order to cause radial clamping between the mounting element and the stationary object.

26. The angular-position measuring device according to claim 8, wherein the diameter of the mounting element can be changed by means of the clamping element.

27. The angular-position measuring device according to claim 10, wherein the diameter of the mounting element can be changed by means of the clamping element.

28. The angular-position measuring device according to claim 8, wherein the clamping element has a surface extending obliquely with respect to the axis of rotation, and the clamping element is radially displaced by an axial displacement of the actuating element.

29. The angular-position measuring device according to claim 10, wherein the clamping element has a surface extending obliquely with respect to the axis of rotation, and the clamping element is radially displaced by an axial displacement of the actuating element.

30. The angular-position measuring device according to claims 5, 8 or 10, wherein the actuating element is a screw with a conical surface formed thereon and is seated displaceable around an axis parallel with the axis of rotation.

31. The angular-position measuring device according to claim 30 wherein the actuating element is a screw with a conical surface formed thereon and is seated displaceable around an axis parallel with the axis of rotation.

32. The angular-position measuring device according to claim 8, wherein the actuating element has an eccentric surface and is seated in the mounting element rotatable around an axis which is parallel with the axis of rotation.

33. The angular-position measuring device according to claim 10, wherein the actuating element has an eccentric surface and is seated in the mounting element rotatable around an axis which is parallel with the axis of rotation.

34. The angular-position measuring device according to claim 32, wherein the eccentric surface of the rotatable clamping element can be brought into contact with a surface of the stationary object.

35. The angular-position measuring device according to claim 32, wherein the eccentric surface of the rotatable clamping element can be brought into contact with a surface of the stator.

36. The angular-position measuring device according to claim 1, further comprising a coupling consists of two orthogonally disposed parallelograms, and each parallelogram consists of leaf springs arranged parallel with each other, and at least the leaf springs of one parallelogram have the mounting element for radial clamping on the stationary object or the stator.

37. The angular-position measuring device according to claim 1, wherein the stationary object has a mounting tube, whose inner or outer shell surface is used for radial clamping.

38. The angular-position measuring device according to claim 37, wherein the mounting tube is a component of a motor.

39. An angular-position measuring device for measuring the angular position between a stationary object and an object which is rotatable with respect to the stationary object on an axis of rotation, the device comprising:

a scanning unit for scanning a scale wherein the scanning unit is fastened on a stator of the angular-position measuring device;

a mounting element provided between the stator and the stationary object for fastening the stator in a torsion-proof manner on the stationary object, wherein the mounting element has at least a clamping element for radial clamping between the stator of the angular-position measuring device and the stationary object, wherein the clamping element or an actuating element cooperating with the clamping element is aligned in a direction parallel with the axis of rotation and is accessible and actuable in this direction for clamping; and a torsion-proof, yet radially and axially resilient coupling interposed between the stator of the angular-position measuring device and the stationary object, wherein the mounting element with at least one clamping element is provided for radial clamping between the stator and the coupling.

40. The angular-position measuring device according to claim 39, wherein the clamping element is displaceable in order to cause radial clamping between the mounting element and the stationary object.

41. The angular-position measuring device according to claim 39, wherein the clamping element is rotatable in order to cause radial clamping between the mounting element and the stationary object.

42. The angular-position measuring device according to claim 39, wherein the clamping element is deformable in order to cause radial clamping between the mounting element and the stationary object.

43. The angular-position measuring device according to claim 39, wherein the clamping element has a surface extending obliquely with respect to the axis of rotation, and the clamping element is radially displaced by an axial displacement of the actuating element.

44. The angular-position measuring device according to claim 37, wherein the actuating element is a screw with a conical surface formed thereon and is sealed displaceable around an axis parallel with the axis of rotation.

45. The angular-position measuring device according to claim 39, wherein the actuating element has an eccentric surface and is seated in the mounting element rotatable around an axis which is parallel with the axis of rotation.

46. The angular-position measuring device according to claim 39, wherein the coupling consists of two orthogonally disposed parallelograms, and each parallelogram consists of leaf spring arranged parallel with each other, and at least the leaf springs of one parallelogram have the mounting element for radial clamping on the stationary object or the stator.

47. The angular-position measuring device according to claim 39, wherein the stationary object has a mounting tube, whose inner or outer shell surface is used for radial clamping.

48. The angular-position measuring device according to claim 47, wherein the mounting tube is a component of a motor.

49. An angular-position measuring device for measuring the angular position between a stationary object and an object which is rotatable with respect to the stationary object on an axis of rotation, the device comprising:

a scanning unit for scanning a scale wherein the scanning unit is fastened on a stator of the angular-position measuring device;

a mounting element provided between the stator and the stationary object for fastening the stator in a torsion-proof manner on the stationary object, wherein the mounting element has at least a clamping element for radial clamping between the stator of the angular-position measuring device and the stationary object, wherein the clamping element or an actuating element cooperating with the clamping element is aligned in a direction parallel with the axis of rotation and is accessible and actuable in this direction for clamping; and a torsion-proof, yet radially and axially resilient coupling interposed between the stator of the angular-position measuring device and the stationary object, wherein the mounting element with at least one clamping element is provided for radial clamping between the stationary object and the coupling.

50. The angular-position measuring device according to claim 49, wherein the actuating element has an eccentric surface and is seated in the mounting element rotatable around an axis which is parallel with the axis of rotation.

51. The angular-position measuring device according to claim 50, wherein the eccentric surface of the rotatable clamping element can be brought into contact with a surface of the stationary object.

52. The angular-position measuring device according to claim 49, wherein the coupling consists of two orthogonally disposed parallelograms, and each parallelogram consists of leaf springs arranged parallel with each other, and at least the leaf springs of one parallelogram have the mounting element for radial clamping on the stationary object or the stator.

53. The angular-position measuring device according to claim 49, wherein the clamping element is displaceable in order to cause radial clamping between the mounting element and the stationary object.

54. The angular-position measuring device according to claim 49, wherein the clamping element is rotatable in order to cause radial clamping between the mounting element and the stationary object.

55. The angular-position measuring device according to claim 49, wherein the clamping element is deformable in order to cause radial clamping between the mounting element and the stationary object.

56. The angular-position measuring device according to claim 49, wherein the clamping element has a surface extending obliquely with respect to the axis of rotation, and the clamping element is radially displaced by an axial displacement of the actuating element.

57. The angular-position measuring device according to claim 49, wherein the stationary object has a mounting tube, whose inner or outer shell surface is used for radial clamping.

58. The angular-position measuring device according to claim 57, wherein the mounting tube is a component of a motor.

* * * * *

UNITED STATES PATENT AND TRADEMARK OFFICE
CERTIFICATE OF CORRECTION

PATENT NO. : 5,758,427
DATED : June 2, 1998
INVENTOR(S) : Kurt Feichtinger et al.

It is certified that error appears in the above-identified patent and that said Letters Patent is hereby corrected as shown below:

In the Claims

In claim 30, line 2, delete "5,".

In claim 36, line 2, after "coupling" insert --that--.

In claim 44, line 2, change "37" to --39--.

Signed and Sealed this

Twentieth Day of June, 2000

Attest:

Attesting Officer

Q. TODD DICKINSON

Director of Patents and Trademarks